US006175577B1

(12) United States Patent
Van Den Heuvel

(10) Patent No.: US 6,175,577 B1
(45) Date of Patent: Jan. 16, 2001

(54) TRANSMISSION SYSTEM FOR TRANSMITTING A FLEXIBLE MULTIPLEX SIGNAL

(75) Inventor: Sebastiaan A. F. A. Van Den Heuvel, Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/031,373

(22) Filed: Feb. 26, 1998

(30) Foreign Application Priority Data

Feb. 28, 1997 (EP) .................................................. 97200606

(51) Int. Cl.[7] ...................................................... H04J 3/02
(52) U.S. Cl. ............................ 370/537; 370/535; 348/423
(58) Field of Search ................................... 370/522, 486, 370/487, 490, 537, 535, 538; 348/423

(56) References Cited

U.S. PATENT DOCUMENTS 5,477,263 * 12/1995 O'Callaghan et al. ............... 348/423

FOREIGN PATENT DOCUMENTS

WO9720413   6/1997 (WO) ............................ H04L/12/56

OTHER PUBLICATIONS

MPEG–2, DVB, JSAT Transport Demultiplexer, Preliminary Technical Manual published by LSI Logic under document No. DB14–000007, Draft Jul. 30, 1996, pp. 4-12-4-15.

* cited by examiner

Primary Examiner—Joseph L. Felber
(74) Attorney, Agent, or Firm—Steven R. Biren

(57) ABSTRACT

In an MPEG-2 transmission system a plurality of programs each consisting of a plurality of elementary streams are multiplexed on a transport stream by a multiplexer (8). The transport stream is transmitted by the transmitting means (10) via a transmission medium (16) to a receiver (18). In the receiver (10) the signal is demodulated by the receiving means (12) and demultiplexed by the demultiplexer (14).

In order to be able to find the different elementary streams which form a program several tables are used. Said tables which can change over time, are updated by information present in the transport stream. The tables are identified by a version number in order to be able to distinguish different versions of them. The version numbers are not necessarily subsequent numbers. In a prior art transmission system filtering has to be performed on all possible version numbers to find updates of a table.

In the transmission system according to the present invention, filtering is performed by only selecting sections having a version number which is different from the previous version numbers.

11 Claims, 5 Drawing Sheets

TRANSMISSION SYSTEM FOR TRANSMITTING A FLEXIBLE MULTIPLEX SIGNAL

BACKGROUND OF THE INVENTION

The present invention is related to a transmission system for transmitting a multiplex signal from a transmitter to a receiver, said multiplex signal comprising at least one information section carrying information about the multiplex signal, the receiver comprising evaluation means for evaluating said information section, said evaluation means being arranged to select information sections with symbol values corresponding to a predetermined sequence of symbol values, the receiver further comprises processing means for processing the multiplex signal in dependence on information present in the selected information sections.

The present invention is also related to a receiver, a decoder, a transmission method, a receiving method and a decoding method for use with such a transmission system.

A transmission system according to the preamble is known from the MPEG-2, DVB, JSAT Transport Demultiplexer, Preliminary Technical Manual published by LSI Logic under document number DB14-000007, Draft Jul. 30, 1996, pp. 4-12–4-15.

Digital broadcast systems as they are being standardized, or are already standardized are based on the so-called MPEG-2 transport stream. The MPEG-2 transport stream offers the possibility of transporting digital video signals and other signals, such as related audio or data signals associated therewith in a very flexible way. The MPEG-2 transport stream is based on 188 byte transport packets, which carry a plurality of so-called elementary streams. Each of said elementary streams is identified by a so-called Packet ID (PID). This elementary streams can be (encoded) video streams, audio streams, and related data signals as required for functions like conditional access or electronic program guides (EPG,s).

The relation between a program and the corresponding elementary streams is defined by a plurality of tables. First there is the Program Map Table (PMT) in which the relation between each program in the transport stream and the PID of the related audio and video signals is stored. Second, there is the Program Association Table (PAT) in which the number of programs transported by the transport stream is stored. Further the PAT gives for each of the programs the PID of the elementary stream which carries the entries of the Program Map Table. Finally there is the Conditional Access Table (CAT) which holds the relation between the different types of conditional systems that may be used and the combination of conditional access PID's, table ID's and table ID's associated therewith.

These tables are stored in the receiver and are initialized and updated by information carried by the information sections. These information sections are also identified by a PID. The PID for the PAT is "00", and the PID for the CAT is "10". The PID for the PMT is stored in the PAT at the position corresponding to the program actually to be decoded.

When a program with number i has to be decoded, the PMT table has to be reconstructed from the transport stream. The decoder reads from the Program Association Table the PID for program number i. Using said PID, all elements of the PMT are read from the transport stream, and the complete PMT is built up using said elements. If the PMT is constructed, the demultiplexer can find the elementary streams in the multiplex signal.

Sometimes during a transmission of a multiplex signal the PMT has to be updated due to a change of said multiplex signal. This can be caused by the addition of programs and/or elementary streams. This change is indicated by a changed version number of the Program Association Table entries. In order to be able to find PAT entries of which the version number has changed, the receiver must perform a filtering operation to distinguish between all possible version numbers. Because 5 bits are reserved for the version number of the PAT, 32 different version numbers are possible. This requires 32 filter operations for each PAT entry, resulting in a substantial computational effort.

OBJECTS AND SUMMARY OF THE INVENTION

The object of the transmission system according to the present invention is to provide a transmission system according to the preamble in which the required computational effort has been reduced.

Therefor the invention is characterized in that the evaluation means are arranged for selecting information sections with symbol values differing from a further predetermined sequence of symbol values.

By selecting (filtering) only the information sections with a changed symbol value (e.g. the version number), it is possible to detect that an update of the information carried by the information section (e.g. the PAT) takes place without having to filter all possible symbol values (e.g. version numbers). This reduces the computational effort considerably. It is observed that the scope of the present invention is not limited to the example presented above, but that the invention is applicable in each transmission system in which a change in the constitution of a multiplex signal has to be communicated to a receiver.

BRIEF DESCRIPTION OF THE PREFERRED EMBODIMENTS

An embodiment of the invention is that the information section is arranged for identifying a sequence of symbols corresponding to a conditional access message and in that the processing means are arranged for changing the value of the conditional access message if the string differs from the previous string corresponding to said conditional access message. In conditional access systems often a changing control word is transmitted at regular intervals. In the receiver the received signal is filtered using the expected value of the next conditional access control word. To obtain the expected value of the next conditional control word, the receiver comprises a state machine which stores the conditional access control words in dependence of the state of said state machine. If the state machine is to be initialized at the beginning of transmission, the first conditional access control word is received, and via a table stored in the receiver the corresponding state of the state machine is found. Subsequently the state machine is forced into the state corresponding to the received conditional access control word. It may happen that in the time required for initializing the state machine, already a next conditional access control word is received, leading to a wrong state of the state machine. By filtering only conditional access control words having a value different from the previous value, the state machine can completely be dispensed with resulting in a substantially increased reliability of the system.

BRIEF DESCRIPTION OF THE DRAWINGS

The invention will now be explained with reference to the drawing figures. Herein shows.

DESCRIPTION OF THE PREFERRED EMBODIMENTS

Figure 1:
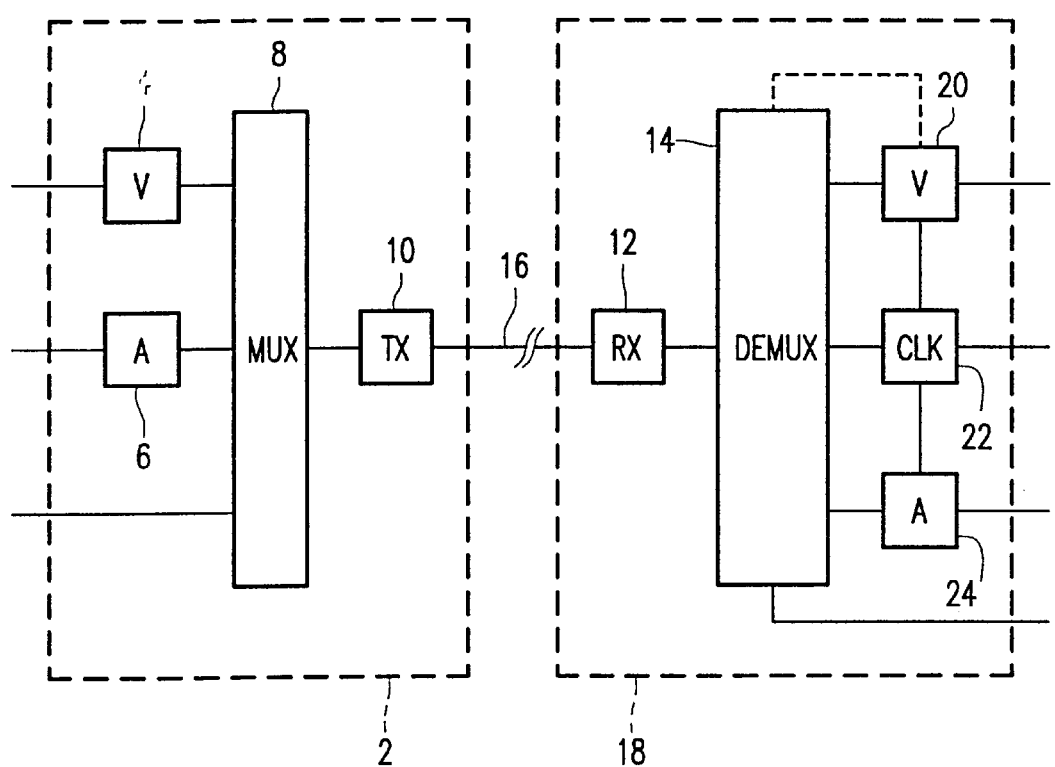
FIG. 1, a transmission system according to the invention.

In the transmission system according to FIG. 1, a digital video signal is applied to an input of a video encoder 4 in a transmitter 2. A digital audio signal is applied to an input of an audio encoder 6 in the transmitter 2. An output of the video encoder 4 and an output of the audio encoder 6 are connected to corresponding inputs of a multiplexer 8. A data signal is applied to a further input of the multiplexer 8.

An output of the multiplexer 8 is connected to an input of transmission means 10. The output of the transmission means 10 is connected to the output of the transmitter 2. The output of the transmitter 2 is connected to a receiver 18 via a transmission medium 16.

The input of the receiver 18 is connected to an input of receiving means 12. The output of the receiving means 12 is connected to an input of a demultiplexer 14. A first output of the demultiplexer 14 is connected to an input of a video decoder 20. A second output of the demultiplexer 14 is connected to an input of an audio decoder 24. A third output of the demultiplexer 14 is connected to an input of a timing correction circuit 22. A first output of the timing correction circuit is connected to a timing input of the video decoder 20, and a second output of the timing correction circuit is connected to a timing input of the audio decoder 24. At the outputs of the video decoder 20 and the audio decoder 24 the decoded video and audio signals are available.

In the explanation of the drawing figures, it is assumed that the audio and video signals are encoded according to the MPEG-2 standard. It is further assumed that the encoded audio and video signals are multiplexed according to an MPEG-2 transport stream.

In the video encoder 4 the input video signal is encoded to generate an elementary stream representing the (compressed) video signal. If hierarchical encoding is used, one video signal can be represented by more than one elementary stream. In the audio encoder 6, the input audio signal or signals are encoded to generate one or more elementary streams. Tile audio signal can be represented by one or more elementary streams in the case of multi-lingual transmission or in the case of transmission of audio signals for a plurality of speakers. The encoded audio and video signals are multiplexed by the multiplexer 8 into an MPEG-2 transport stream. A data signal, e.g. representing teletext information or other program related data signals is also multiplexed into the MPEG-2 transport stream.

The output signal of the multiplexer 8 is transformed by the transmission means 10 into a signal that is suitable for transmission via the transmission medium 16. The operations performed by the transmission means 10 include encoding of its input signal using an error correcting code, and modulating the encoded input signal according to a suitable modulation method. An example of such transmission means are described in the Digital Video Broadcast Standard (DVB).

In the receiver 18 the signal received from the transmission medium 16, is demodulated in the receiving means 12. The demodulated signal is decoded by an error correcting decoder in order to obtain a virtually error free multiplex signal. This multiplex signal is demultiplexed by the demultiplexer 14 using the information carried in the information sections.

The video signal at the output of the demultiplexer 14 is decoded by the video decoder 20 in a video signal ready to be displayed. It is possible that a data signal related to the video signal, e.g. a sub-titling signal, is carried from the demultiplexer 14 to the video decoder 20.

The encoded audio signal at the output of the demultiplexer 14 is decoded by the audio decoder 24. A timing reference signal at the output of the demultiplexer 14 is transformed in a timing signal for the video decoder 20 and the audio decoder 24. The timing signal is used to ensure synchronization between the audio and the video signals of a program. Further a data signal is presented by the demultiplexer 14 which can e.g. be supplied to a PC to provide Internet access.

Figure 2:
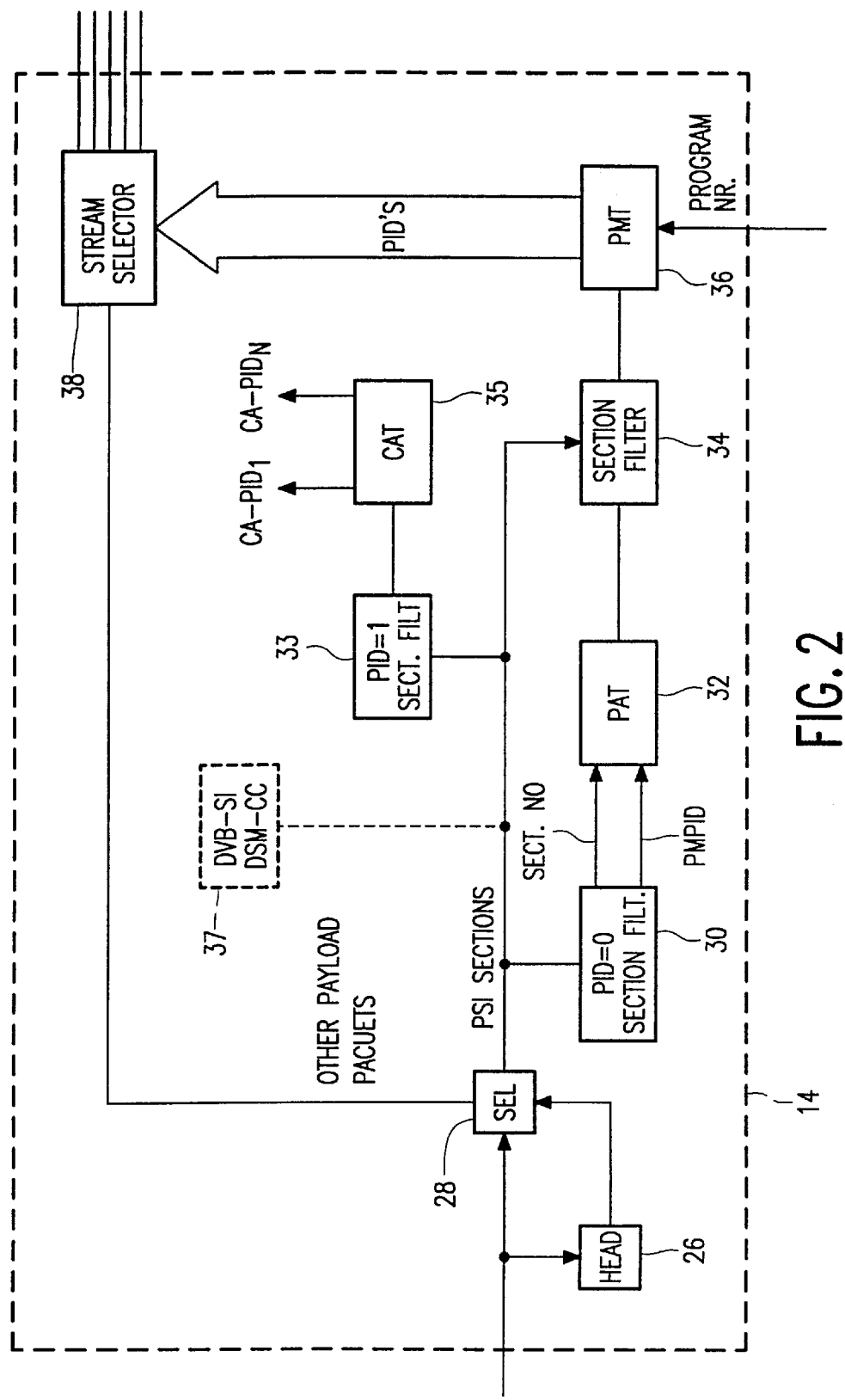
FIG. 2, an implementation of the demultiplexer used in the transmission system according to the invention.

In the demultiplexer 14 according to FIG. 2, the input is connected to an input of a header processor 26 and to an input of a selector 28. An output of the header processor 26 is connected to an input of the selector 28. A first output of the selector 28, carrying a signal representing the information sections, is connected to an input of the evaluation means being here a section filter 30, a section filter 34, a section filter 33 and a section filter 37.

A first output of the section filter 30 carrying a signal SECT. NO representing a section number is connected to a first input of a PAT table memory 32. A second output of the section filter 30, carrying a signal PMPID representing a PID of an entry for the PMT, is connected to a second input of the PAT table memory 32. The output of the PAT table memory 32 is connected to a second input of the section filter 34. An output of the section filter 34 is connected to a first input of a PMT table memory 36. A signal PROGRAM NR. representing a number of a program to be selected is applied to a second input of the PMT table memory 36. An output of the PMT table memory 36, carrying a signal representing the PID's of the elementary streams of the program selected, is connected to a first input of the processing means being here a stream selector 38.

A second output of the selector 28 is connected to a second input of the stream selector 38. At the outputs of the stream selector 28 the elementary streams representing the selected program are available.

The header processor generates a signal that indicates whether the present input packet represents an information section (which can be a PSI section or a privately defined section) or whether it represents an other type of packet. In the case an information section is present, the packet (including header) is passed to the section filters 30, 33, 34 and 37. If a packet carrying audio and video payload is present, the packet is passed to the stream selector 38. The section filter 30 selects all information sections (PSI packets) in which the symbol values, being here the PID value, is equal to the predetermined sequence of symbols, representing here the value of 0. From these packets the section number representing the section of the PAT table is extracted and passed to the PAT table memory. Also the program number and the corresponding program map PID are passed to the PAT table memory 32.

If the PAT table is already available in the PAT table memory 32 it is not necessary anymore to transmit the received program association sections to the PAT table memory. Only if an update of the PAT takes place, the program association sections have to be passed again to the PAT memory 32. An update of the PAT can be detected by a new value of the further predetermined sequence of symbol values, being here the new value of the version number which is carried by the program association section. This version number is not always a number with an incremented value with respect to the previous version number.

In the transmission system according to the prior art it is necessary to perform a filtering operation for each of the possible version numbers in order to detect the presence of a program association section carrying (sections of) an update of the PAT. Because 32 different version numbers are possible in the MPEG-2 standard, 32 filtering operations would be required.

In the transmission system according to the present invention, (a part of) the information sections is passed to the PAT memory 32 if the version number represented by the symbols in the information sections (the program association sections) is different from the version number of the PAT table actually used. To detect a version number different from the previous version number only one filtering operation is required. This leads to a substantial reduction of the computational complexity of the section filter.

The program association sections are passed to the PAT memory 32 until the table is completely updated. The update of the PAT is complete if the field current_next_indicator indicates that the table to be used is the most recently transmitted one. After a completion of the update of the PAT the version number of the currently active table is adjusted to the value received.

The PID's corresponding to the PMT sections of the programs as stored in the program association table memory 32 are passed to the section filter 34. The section filter 34 uses this PID values to select the program map sections required for constructing the program map table from the program stream. The program map sections carry information about the mapping of programs on the elementary streams. This means that the program map sections carry for each program in the transport stream the PID values of the elementary streams carrying the audio, video and data signals for said program. The program map sections selected by the section filter 34 are passed to the PMT memory 36. As was previously explained with respect to the PAT, the PMT can be updated during the transmission of a program. This update is performed according to the same inventive idea as was used with the update of the PMT.

The PMT table memory 36 passes in response to a control signal indicating a program number, the PID values of all elementary streams required for said program. These PID values are stored in the stream selector 38, which uses the PID values to extract the elementary streams from the transport stream.

The same idea of using tables to hold information which can be regularly updated is used with respect to the conditional access system and for so-called DVB-SI (Service) information and for so-called DSM-CC information for enabling control of the elementary steams by a user. The PID of the conditional access sections has a fixed value of "01". The conditional access sections carry the PID values of the elementary streams in which the so-called EMM and ECM conditional access words for each of the used conditional access systems can be found. The PID values of the conditional access related sections is stored in the Conditional Access Table (CAT) memory 35. Besides the EMM and the ECM words additional information about the conditional access system can be transmitted in these conditional access sections.

Figure 3:
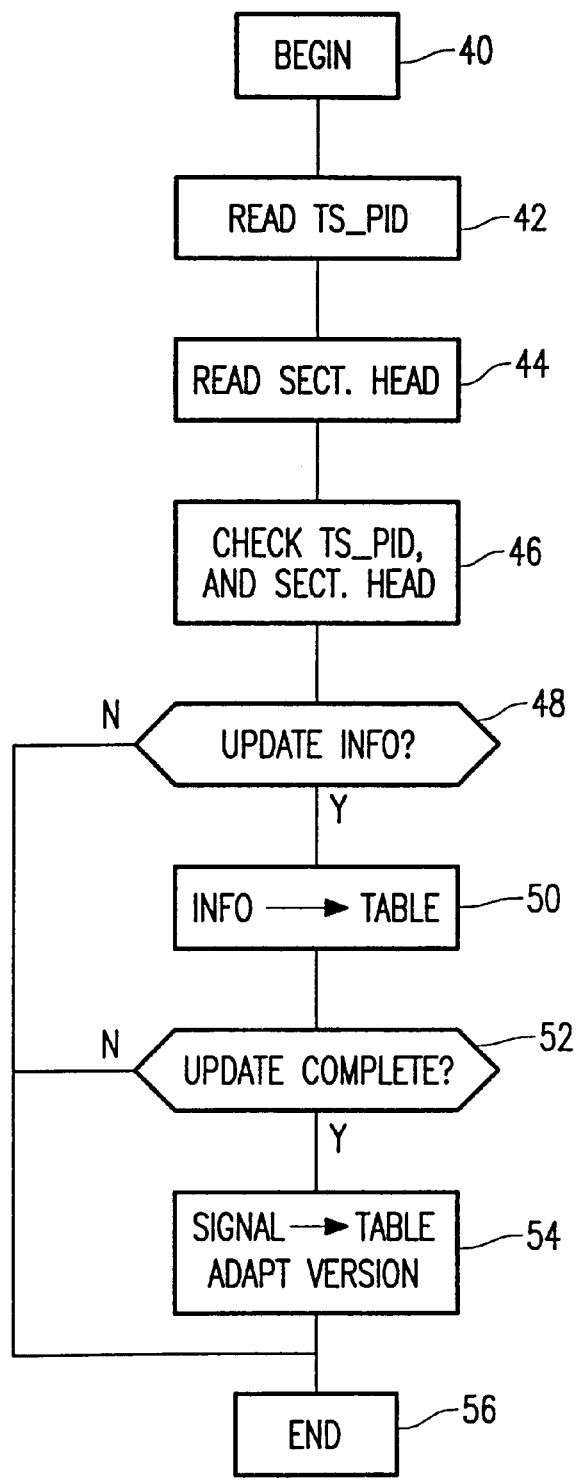
FIG. 3, a flow diagram of a routine for a programmable processor to implement the section filters 30, 33, 34, and 37 according to FIG. 2.

In the flow chart according to FIG. 3, the numbered instructions have the following meaning:

| No. | Label | Meaning |
| --- | --- | --- |
| 40 | BEGIN | The routine is started, and the used variables are initialized. |
| 42 | READ TS_PID | The PID of the current section in the transport stream is read. |
| 44 | READ SECT. HEAD. | The header of the current section in the transport stream is read. |
| 46 | CHECK TS_PID AND SECT. HEAD. | It is checked if the value of the section PID and the relevant fields in the section header meet the filter requirements. |
| 48 | UPDATE INFO? | It is checked whether the table is already completely updated. |
| 50 | INFO → TABLE | The information read from a selected section is passed to the table to be updated. |
| 52 | UPDATE COMPLETE? | It is checked whether the table is completely updated. |
| 54 | SIGNAL → TABLE ADAPT VERSION | The completion of the update is communicated to the table memory, and the version number of the active table is updated. |
| 56 | END | The routine is ended and control is transferred to the calling process. |

In instruction 40 the filter routine is started, and the relevant variables are intialized. In instruction 42 the PID of the currently available information section is read. In instruction 44 the header of the currently available information section is read.

In instruction 46 the filtering operation according to the invention is performed. This is done by calculating a Boolean value F according to the following expression:

$$F=(TS\_PID=SF\_PID) \;\&\&\; (PosValue \;\&\; PosMask=SectionHeader \;\&\; PosMask) \;\&\&\; (NegValue \;\&\&\; NegMask \neq SectionHeader \;\&\; NegMask)$$

The first part of the expression represents the comparison of the PID of the PSI section read from the transport stream. For the section filter 30 the value SF_PID is equal to "00". For the section filter 34 the filtering is performed for all values of the SF_PID found in the PAT table memory 34, indicating the PID values of the sections carrying the PID values of the elementary streams corresponding to the different programs. For the section filter 33 the value of SF_PID is equal to "01". For the section filter 37, the SF_PID values are equal to the PID values of the different types of DVB-SI information as prescribed in the DVB standard.

The second part of the expression is related to the detection of the presence of certain fields indicated with PosValue in the header of the section. This fields can e.g. be the Table ID represented by the first byte of the header of an information (PSI) section and/or the program number. The Table ID can be used to distinguish between information for different tables carried by information sections with the same PID. For the section filter 30 the table ID value is equal to "00". For the section filter 34 the Table ID value is "01", and for the section filter 33, the Table ID is equal to "02".

In the case only the Table ID has to be selected, the value of PosMask is equal to "FF000000". PosValue is equal to "00XXXXXXXXXXXXXX" in which X indicates a don't care value for the section filter 30. For the section filters 33 and 34 these values are "01XXXXXXXXXXXXXX" and "02XXXXXXXXXXXXXX" respectively.

The third part of the expression is related to the detection of a change in a given field of the header of the information section. As explained before, this can be the version number of the table. In the case of the version number, NegValue is equal to the version number of the table currently in use. The value of NegMask is "00000000003E0000"

In instruction 48 it is checked whether the information in the currently processed information section has to be passed to the corresponding table. This check is performed by comparing F with the logical value "1". If F is equal to "0", the information in the section must not be passed to the table and the routing is terminated in instruction 56. If F is equal to "1", in instruction 50 the relevant information is passed to the corresponding table memory.

In instruction 52 it is checked whether the update of the table is completed. This can e.g. be detected by counting the number of sections already received, and comparing this value with the value of the field last_section_number in the section header incremented by 1. If these two values are equal, this is signaled to the table memory in instruction 54, which can allow use of the table if the current_next_ indicator changes from "0" to "1". Furthermore in instruction 54 the variable NegValue is made equal to the version number of the last section received.

Figure 4:
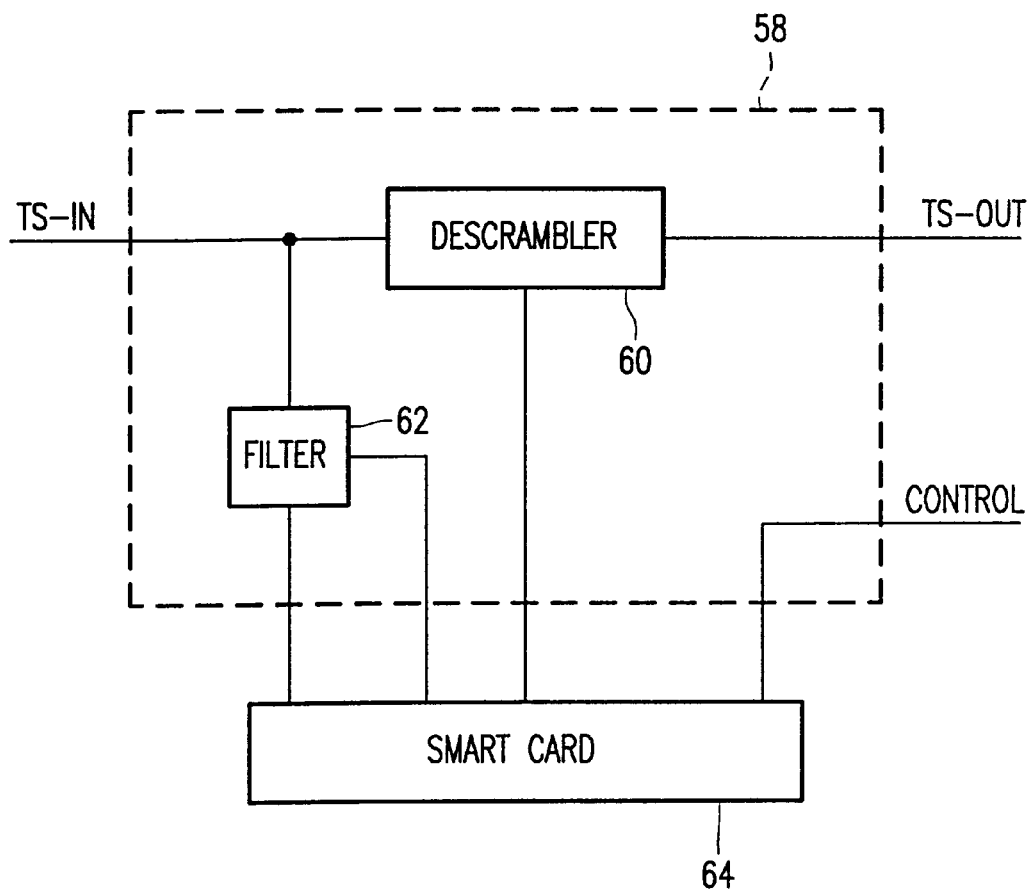
FIG. 4, a conditional access system to be used with the transmission system according to FIG. 1.

In the conditional access system 58 according to FIG. 4, which can be used in the transmission system according to FIG. 1, an MPEG-2 transport stream is applied to an input of a descrambler 60, and to a first input of a section filter 62. The output of the filter 62 is connected to a first input of a smart card 64. A first output of the smart card 62 is connected to a second input of the filter 62. A second output of the smart card 64 is connected to a second input of the descrambler 60. A control signal is applied to a second input of the smart card 64. At the output of the descrambler 60 the descrambled transport stream is available.

The descrambler is arranged for deriving a descrambled transport stream from the scrambled transport stream at its input. To enable the descrambling, control words are transmitted periodically from the smart card to the descrambler. In order to increase the difficulty to gain unauthorized access to a program, the control words are not fixed, but are calculated by the smart card 64 from encrypted time variant control messages extracted from the transport stream. The filter 62 is arranged for filtering and extracting the control messages from the transport stream, and passing them to the smart card 64. The control messages are carried by conditional access sections having a PID which can be read from the Conditional Access Descripor field in the PMT memory 36 (FIG. 2). The PID and optionally the Table ID constitute the predetermined sequence of symbol values.

In a transmission system as described in part 10 of the DAVIC 1.2 specification, the section filter uses a state machine for determining an expected value of the next control message. A problem with this state machine is its initialization. In the prior art system, the first available control message is extracted from the transport stream. The corresponding state of the state machine is found by using a look up table which maps the control message to said state. Subsequently the state machine is forced into the state found. It can happen that the next control message is already present before the state machine is set in its correct state, leading to a failure of the synchronization of the state machine. According to the inventive idea of the present invention, the state machine is completely dispensed with, but the filter 62 is arranged to pass all control messages being different from the previous one. In this embodiment the further predetermined sequence of symbol values is constituted by the most recent received values of the control message. In this way the filter 62 performs a similar filter operation as the state machine, without the problems of initialization.

Figure 5:
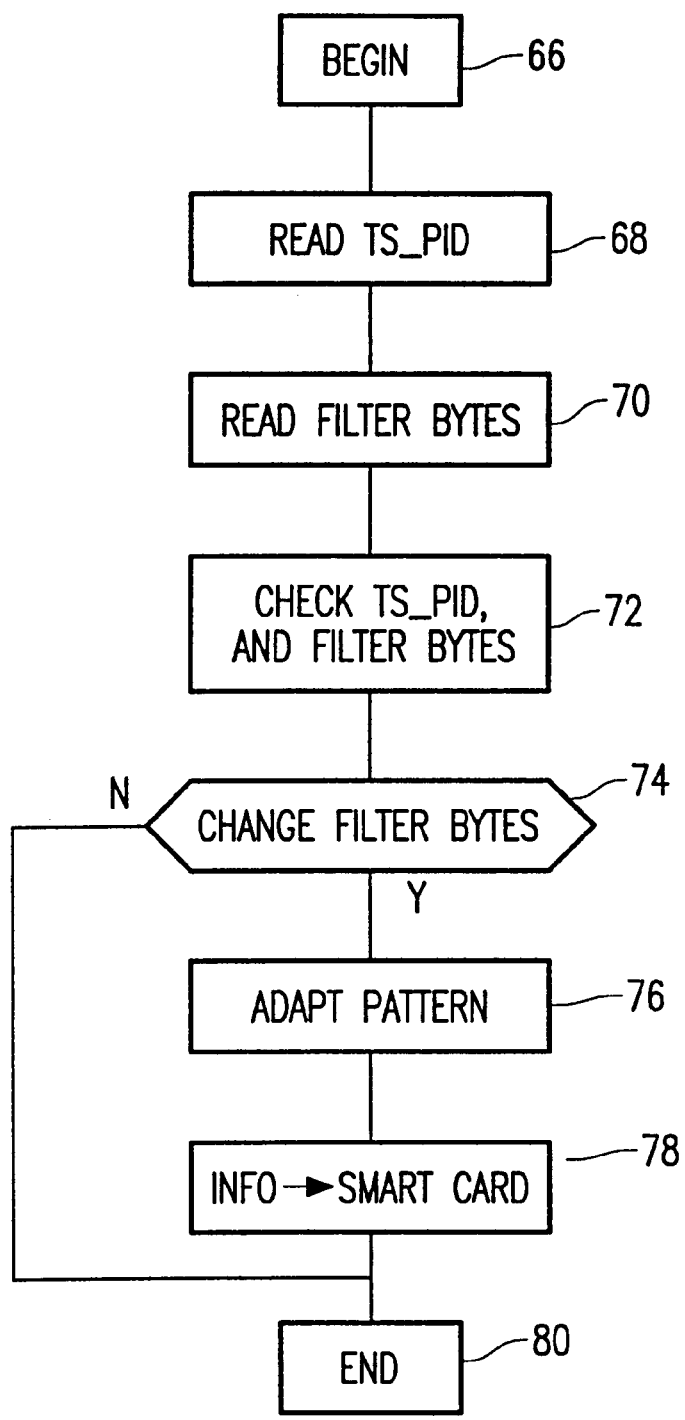
FIG. 5, a flow diagram of a routine for a programmable processor to implement the section filter 62 according to FIG. 5.

In the routine according to FIG. 5, the numbered instructions have the following meaning:

| No. | Label | Meaning |
| --- | --- | --- |
| 66 | BEGIN | The routine is started and the variables are initialized. |
| 68 | READ TS_PID | The PID of the current PSI section is read. |
| 70 | READ FILTER BYTES | The bytes to be filtered are read from the current PSI section. |
| 72 | CHECK TS_PID AND FILTER BYTES | The transport stream PID and the bytes to be filtered are compared with reference values. |
| 74 | CHANGED FILTER BYTES? | It is checked whether the value of the bytes to be filtered are changed. |
| 76 | ADAPT PATTERN | The reference value of the bytes to be filtered is adapted. |
| 78 | INFO → SMART CARD | The information carried by the current PSI section is passed to the smart card 64. |
| 80 | END | The routine is terminated and the control is passed to the calling routine. |

In instruction 66 of the routine according to FIG. 5, the routine is started and the variables are initialized. In instruction 68 the PID of the current information section is read. In instruction 70 the bytes to be filtered are read from the current information section. In instruction 72 the PID value and the value of the filtered bytes (e.g. Table ID, Table ID extension and private Conditional Access messages) is compared with corresponding reference values. The result is available in a Boolean G. The value of G is found according to:

G=(TS_PID=CA_PID) && (PosMask & PosValue=PosMask & SectionHeader) && (NegMask & FILTER_BYTES≠NegMask & PREVIOUS_FILTER BYTES)

The filter bytes are found from the information section by applying a suitable mask on the parts of the information section containing the bytes to be filtered. In instruction 74 the value of G is evaluated. If G is equal to zero, indicating that on the information section with a PID corresponding to the CA_PID and a header corresponding to PosValue, no change of the bytes to be filtered is found, the routine is terminated in instruction 80. Otherwise, in instruction 76 the current value of the bytes to be filtered are stored as the previous bytes to be filtered for later use. In instruction 78 the conditional access information of the current PSI section is passed to the smart card for further processing

What is claimed is:

1. Transmission system for transmitting a multiplex signal comprising at least one information section carrying information about the multiplex signal, comprising:
   a receiver for receiving the multiplex signal,
   an evaluation means arranged to select information sections with symbol values corresponding to a predetermined sequence of symbol values, the evaluation means also arranged to select information sections with symbol values different from a further predetermined sequence of symbol values, and a processing means for processing the multiplex signal in dependence on at least two types of information present in the selected information sections.

2. Transmission system according to claim 1, wherein the multiplex signal comprises a plurality of elementary streams each being associated to one program carried by the multiplex signal, the receiver comprising means for storing the correspondence between a program and the plurality of elementary streams, and in that the processing means are arranged for updating the correspondence between a program and the plurality of elementary streams in dependence on the information found in the information sections.

3. Transmission system according to claim 1 wherein the further predetermined sequence of symbol values comprises symbol values carried by a previously received information section.

4. Transmission system according to claim 1, wherein the information section is arranged for identifying a sequence of symbols corresponding to a conditional access message and in that the processing means are arranged for changing the value of the conditional access message if the string differs from the previous string corresponding to said conditional access message.

5. Receiver for receiving a multiplex signal comprising at least one information section carrying information about the multiplex signal, comprising:

an evaluation means for evaluating said information section, said evaluation means being arranged to select information sections with symbol values corresponding to a predetermined sequence of symbol values, the evaluation means also arranged to select information sections with symbol values different from a further predetermined sequence of symbol values, and a processing means for processing the multiplex signal in dependence on at least two types of information present in the selected information sections.

6. Receiver according to claim 5, wherein the multiplex signal comprises a plurality of elementary streams each being associated to one program carried by the multiplex signal, the receiver comprising means for storing the correspondence between a program and the plurality of elementary streams, and in that the processing means are arranged for updating the correspondence between a program and the plurality of elementary streams in dependence on the information found in the information sections.

7. Receiver according to claim 5, wherein the information section is arranged for identifying a sequence of symbols corresponding to a conditional access message and in that the processing means are arranged for changing the value of the conditional access message if the string differs from the previous string corresponding to said conditional access message.

8. Demultiplexer for demultiplexing a multiplex signal comprising at least one information section carrying information about the multiplex signal, comprising:

an evaluation means for evaluating said information section arranged to select information sections with symbol values corresponding to a predetermined sequence of symbol values, the evaluation means also arranged to select information sections with symbol values different from a further predetermined sequence of symbol values, and a processing means for processing the multiplex signal in dependence on at least two types of information present in the selected information sections.

9. Method for demultiplexing a multiplex signal comprising at least one information section carrying information about the multiplex signal, comprising:

evaluating said information section, selecting information sections with symbol values corresponding to a predetermined sequence of symbol values, selecting information sections with symbol values differing from a further predetermined sequence of symbol values, and processing the multiplex signal in dependence on at least two types of information present in the selected information sections.

10. Method according to claim 9, wherein the multiplexer signal comprises a plurality of elementary streams each being associated to one program carried by the multiplex signal, the method comprises storing the correspondence between a program and the plurality of elementary streams, and updating the correspondence between a program and the plurality of elementary streams in dependence on the information found in the information sections.

11. Method according to claim 9, wherein the information section is arranged for identifying a sequence of symbols corresponding to a conditional access message and in that the method comprises changing the value of the conditional access message if the string differs from the previous string corresponding to said conditional access message.

* * * * *